United States Patent
Yoshioka

(10) Patent No.: US 7,505,923 B1
(45) Date of Patent: Mar. 17, 2009

(54) NETWORK BASED FRANCHISE BUSINESS SYSTEM AND METHOD

(76) Inventor: Tetsuro Yoshioka, 2-15-22 Bancho, Takamatsu-City, Kagawa Prefecture (JP) 760-0017

(*) Notice: Subject to any disclaimer, the term of this patent is extended or adjusted under 35 U.S.C. 154(b) by 178 days.

(21) Appl. No.: 09/608,038

(22) Filed: Jun. 30, 2000

(51) Int. Cl.
*G06Q 30/00* (2006.01)
(52) U.S. Cl. ...................................................... 705/26
(58) Field of Classification Search ................. 705/26, 705/27, 37, 80; 709/80, 218
See application file for complete search history.

(56) References Cited

U.S. PATENT DOCUMENTS

| | | | | |
|---|---|---|---|---|
| 5,712,989 | A * | 1/1998 | Johnson et al. | 705/28 |
| 5,970,472 | A * | 10/1999 | Allsop et al. | 705/26 |
| 6,272,472 | B1 * | 8/2001 | Danneels et al. | 705/27 |
| 6,327,628 | B1 * | 12/2001 | Anuff et al. | 719/311 |
| 6,332,135 | B1 * | 12/2001 | Conklin et al. | 705/80 |
| 6,338,050 | B1 * | 1/2002 | Conklin et al. | 705/80 |
| 6,351,738 | B1 * | 2/2002 | Clark | 705/37 |
| 6,393,468 | B1 * | 5/2002 | McGee | 709/218 |
| 6,456,699 | B1 * | 9/2002 | Burg et al. | 379/88.17 |
| 6,460,072 | B1 * | 10/2002 | Arnold et al. | 709/203 |
| 6,556,975 | B1 * | 4/2003 | Wittsche | 705/26 |
| 6,587,837 | B1 * | 7/2003 | Spagna et al. | 705/26 |
| 6,629,092 | B1 * | 9/2003 | Berke | 707/3 |
| 6,629,135 | B1 * | 9/2003 | Ross et al. | 709/218 |
| 6,633,849 | B1 * | 10/2003 | Dodd | 705/1 |
| 2001/0032145 | A1 * | 10/2001 | Cronin | 705/26 |
| 2002/0002501 | A1 * | 1/2002 | Reyda et al. | 705/26 |

FOREIGN PATENT DOCUMENTS

| | | |
|---|---|---|
| JP | 11-031184 | 2/1999 |
| JP | 2001-331670 | 11/2001 |
| JP | 2001-350955 | 12/2001 |

OTHER PUBLICATIONS

Microsoft Computer Dictionary, Fifth Edition.*
Microsoft Dictionary, Third Edition, Copyright 1997.*
Verticalnet.com webpages captured via the WayBackMachine (archieve.org).*
Gregory Gilligan, "Multiple-Store Inventories Online at the Circuit City E- Superstore", Richmond Times—Dispatch. Richmond, Va.: Jul. 26, 1999. p. D.21☐☐http://proquest.umi.com/pqdweb?did=43492816&sid=3&Fmt=3&clientId=19649&RQT=309&VName=PQD.*
English Abstracts for JP 2001-350955 and JP 11-031184 listed above.
Japanese Patent Office Action of Apr. 30, 2002 and English translation of same.
Japanese Patent Office Action of Jul. 16, 2002 and English translation of same.

* cited by examiner

Primary Examiner—Jeffrey A. Smith
Assistant Examiner—Mila Airapetian

(57) ABSTRACT

A System (1) provides electronic commerce for franchise stores over the Internet without such franchise stores creating/maintaining/controlling their own home pages and by reducing the transaction cost for goods sold. The System (1) may include a headquarter server (H.Server) (10) that is connected to franchise store servers (F.Server) (20) and member servers (30), used by members collected by franchise stores, via Internet (40). Moreover, the H.Server (10) can store merchandise (goods) information, goods inventory data, inform franchise stores when their members have accessed, and receive orders from Members or non-Members placed through home page corresponding to particular franchise stores.

15 Claims, 4 Drawing Sheets

NETWORK BASED FRANCHISE BUSINESS SYSTEM AND METHOD

TECHNICAL FIELD

The present invention relates generally to systems and methods of electronic commerce, and more particularly to an electronic shopping system and method for retail franchisees over a network such as the Internet.

BACKGROUND OF THE INVENTION

Recently, companies and stores in various industries create virtual stores by way of their own conventional home pages on the Internet. Through such conventional home page arrangements, the companies/stores receive purchase orders.

In this type of conventional electronic shopping system, it is very important to create home pages which will be attractive to common consumers and that will be able to stimulate consumers' purchasing desires. Furthermore, it is desirable to present a variety of goods, enough to satisfy the high and different demands of the consumers.

Unfortunately, the relative cost required to create and maintain effective home pages can be much higher for medium/small sized enterprises or retail shops, than for large sized companies. The introduction of systems for presenting/providing individual home pages for medium/small sized enterprises may not be adequately effective, since the range of the goods to be displayed is limited. Thus, even if a medium/small sized enterprise decides to start an electronic commerce system on their own, it may be difficult to obtain satisfactory effects.

In light of the above, it would be desirable to arrive at a practical franchise system for retailers, such as music record retailers.

SUMMARY OF THE INVENTION

According to the present invention, retailers, such as music record retailers, can be organized together under a Franchise System that establishes a headquarter for electronic commerce, such as Internet business. Such a headquarter can include a headquarter server (hereafter referred to as "H.Server"). Retailer members (e.g., franchise stores) may each have their own server (hereafter referred to F.Server) connected to the H.Server via a network (e.g., the Internet). Members (e.g., potential consumers) collected by franchise stores individually can each have their own server (hereafter referred to as "M.Server") also connected with H.Server via the network (e.g., Internet).

According to the present invention, an H.Server can include the following data and systems:

Merchandise Information Memory Data, that includes gathered information for various goods (hereafter, referred to as "Goods") sold by Franchise Stores, such as records, CD, MD, Music Tape, Video Tape and DVD, etc.;

a Home Page Creation System, that can be realized through several ways and can read the Merchandise Information Memory Data for desired merchandise information, while at the same time collecting each home page data and Franchise Store Identification (ID) data through a Franchise Store's Home page Data Memory System particular to each Franchise Store;

a Home Page Sending Service, that sends information gathered from Merchandise Information Memory Data to the various Franchise Store home pages;

an Order Receiving System that facilitates ordering by Members through the various Franchise Store home pages;

a Received Data Transfer System that transfers order data (received by the Order Receiving System) to the "F.Server" identified by a Member Store ID System, such order data can include a buyer's name and the ordered items; and a Franchise Store (identification) ID System that facilitates the identification of the Franchise Store to which a Member (or non-Member) belongs, including the time(s) that the Members or non-Members have accessed, the Franchise Store ID System identifying the Franchise Store to which a Member belongs based on a uniform resource locator (URL) set up in advance according to predefined rules.

DETAILED DESCRIPTION OF THE INVENTION

Figure 1:
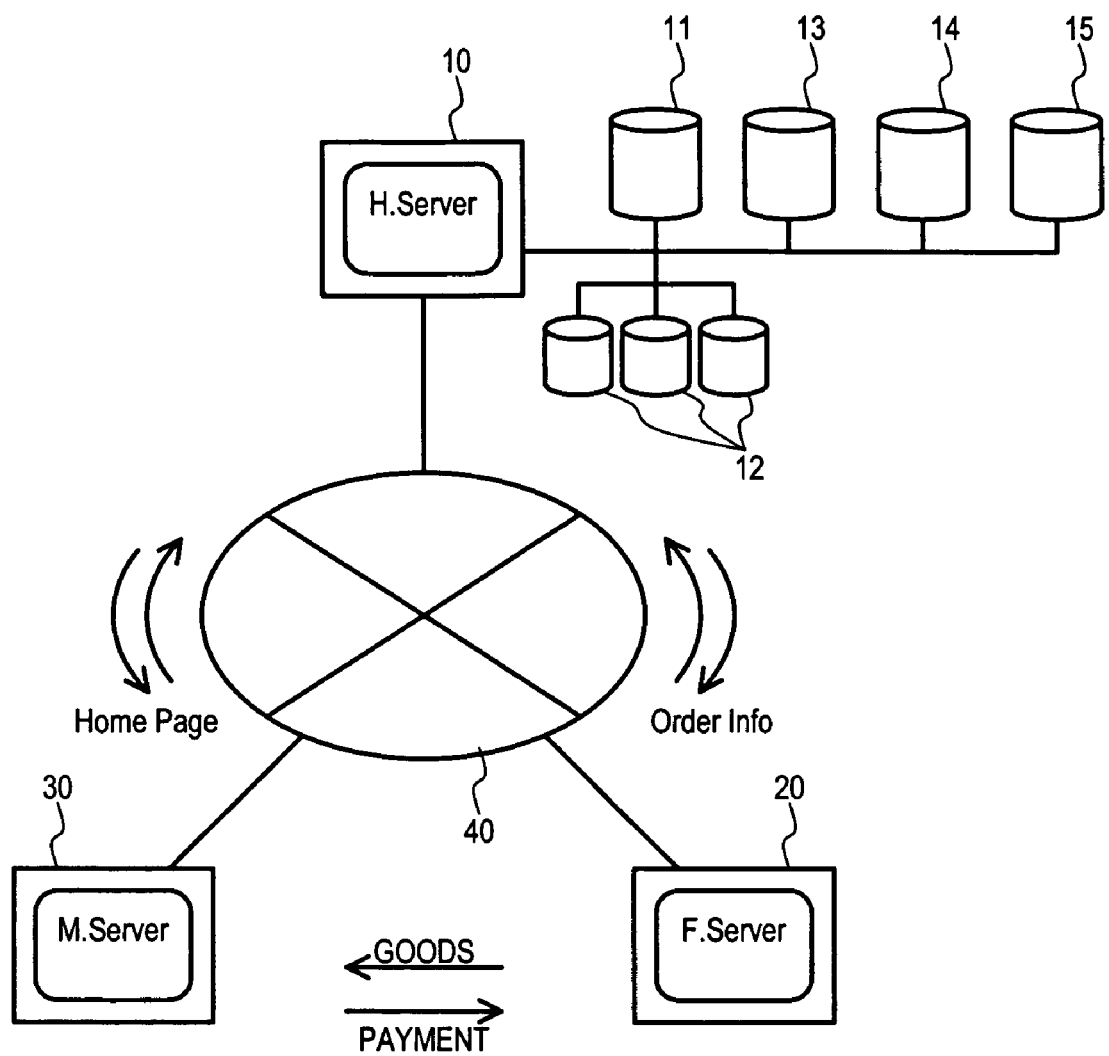
FIG. 1 is a block diagram of a system according one embodiment of the present invention, including associated hardware.

FIG. 1 shows the structure outline of electronic shopping system (hereinafter System 1) according to one embodiment of the present invention. The System 1 includes a headquarter server (H.Server) 10 owned by a headquarter of a Franchise System, franchise servers (F.Server) 20 (only one of which is shown in FIG. 1), owned by one of many Franchise Stores of the Franchise System, member servers (M.Server) 30 (only one of which is shown in FIG. 1) owned by the Members associated with the Franchise Stores, and a network (e.g., Internet) 40 connecting all of them.

H.Server 10 can be equipped with various databases. Among the databases is a Goods Master Data Base 11, in which merchandise data, such as records/CDs/other goods related with the System, are cataloged. H.Server 10 may also be equipped with contents 12 which classify goods entered into Goods Master Data Base 11. Such classification can include, for example, a musician group, a music category group and a best sellers group, etc.

Figure 2:
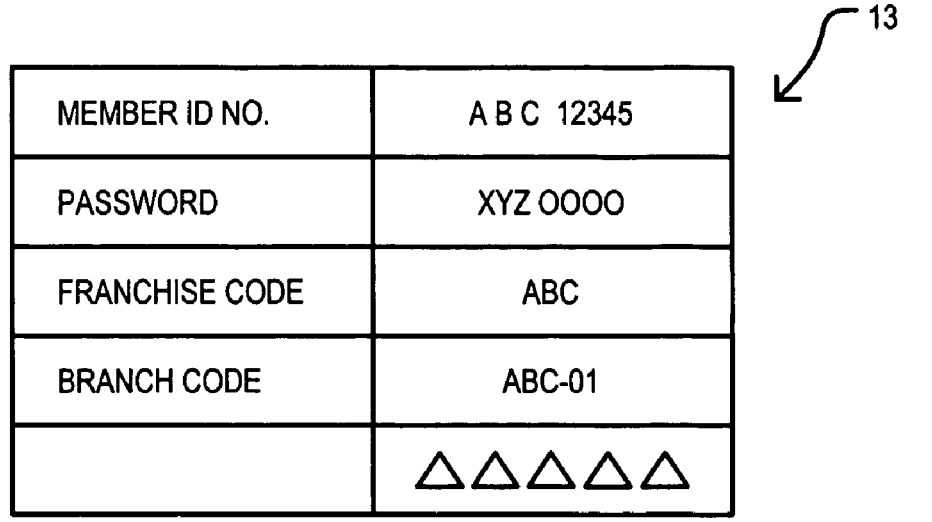
FIG. 2 is a diagram showing one example of a Member Data Base of a system according to one embodiment of the present invention.

H.Server 10 is further be equipped with a Member Entry Data Base 13 where members collected by each Franchise Store in the Franchise System are cataloged. One example of a portion of a Member Entry Data Base is shown in FIG. 2, and designated by the general reference character 13. A Member Entry Data Base 13 can include, for every member, an identification (ID) Number (No.), a password, a Franchise Store code, a Branch Code (if the member belongs to a certain branch of a Franchise Store), and a terminal identification (ID) Code, also called a "cookie", which is used by an H.Server 10 to identify if a member's M.Server 30 has been entered into the Member Entry Data Base 13.

Figure 3:
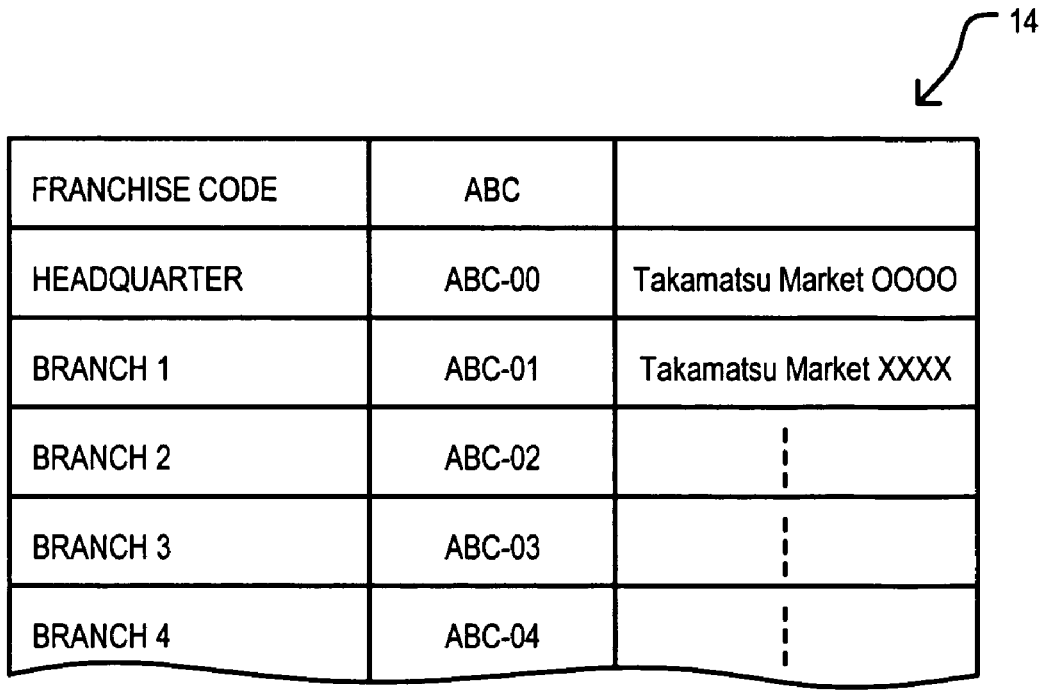
FIG. 3 is a diagram showing one example of a Franchise Store Data Base of a system according to one embodiment of the present invention.

H.Server 10 also includes a Franchise Store Data Base 14 which can include Franchise Store entries. One example of a portion of a Franchise Store Data Base is shown in FIG. 3, and designated by the general reference character 14. Data for every Franchise Store can be entered into the Franchise Store Data Base 14, including a store code and branch code (if any). When a franchise agreement has been made between a store and the Headquarter, data for the store is cataloged in Franchise Store Data Base 14 of H.Server 10, to make such a store a Franchise Store of the System 1.

Figure 4:
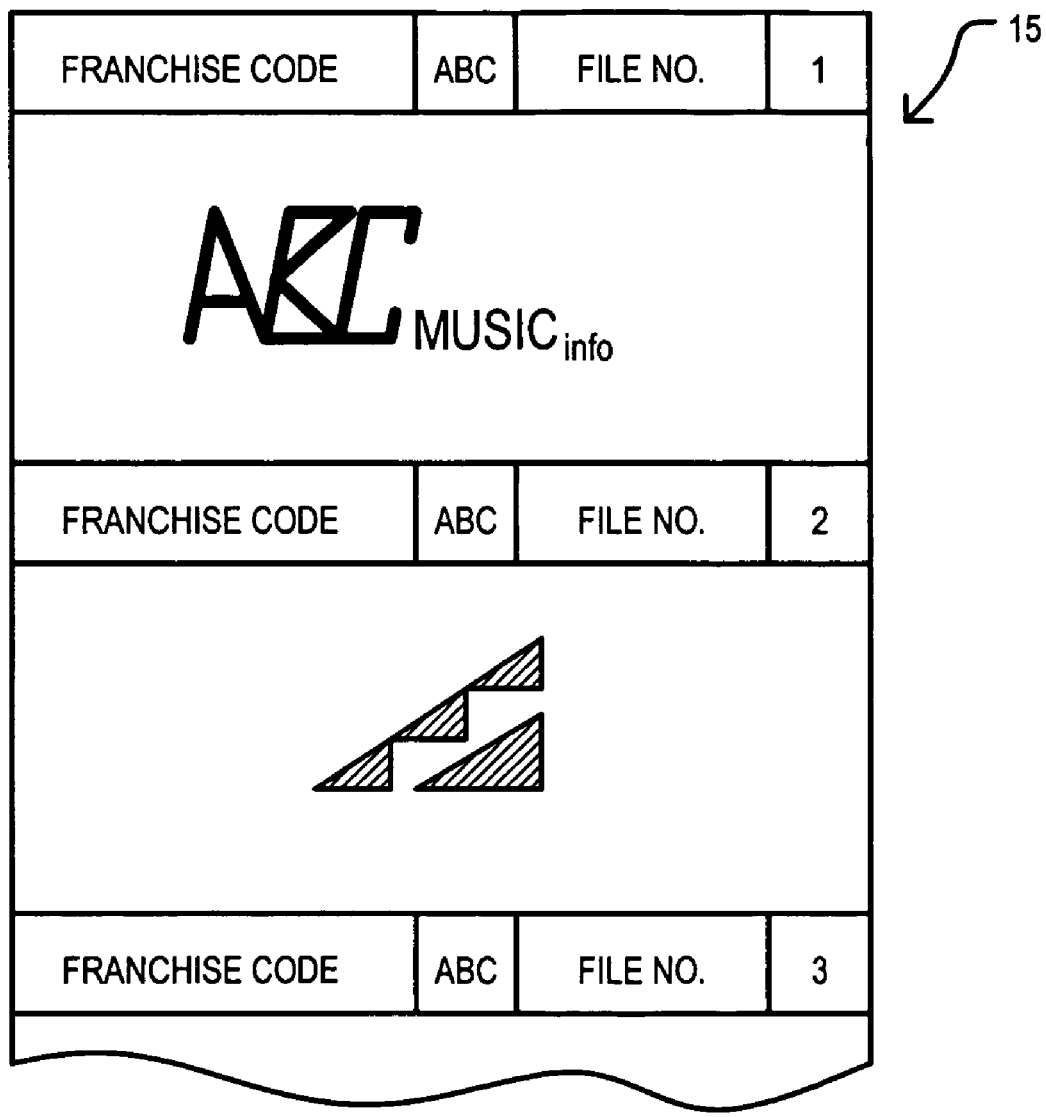
FIG. 4 is a diagram showing a Home Page Data Base of a system according to one embodiment of the present invention.

H.Server 10 may also include a Home Page Data Base 15 in which the home page data of each Franchise Store can be entered. As shown in FIG. 4, for example, the home page data can include store name logos used in creating a home page, figures for the home pages, and a branch list for a Franchise Store, etc.

Figure 5:
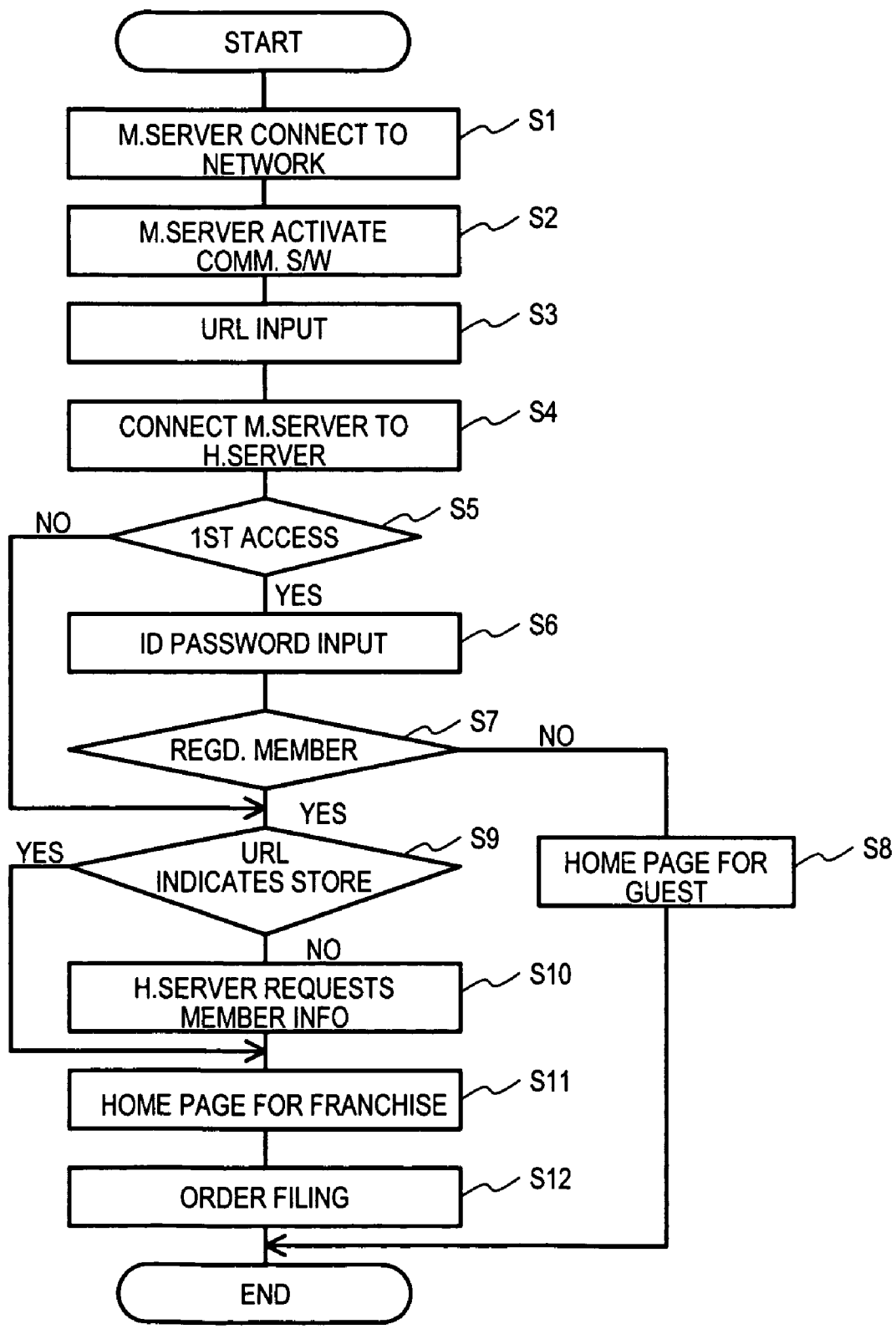
FIG. 5 is a flow diagram showing a method according to of a system according to one embodiment of the present invention.

An operating procedure of the System 1 will now be described in conjunction with a flow chart set forth in FIG. 5. The flow chart of FIG. 5 shows communication between an M.Server 30 and an H.Server 10. When the System 1 is used, a member can make an M.Server 30 (e.g., a personal computer, PC) connect via a service provider using a phone cable first (Step S1). Then, software such as an Internet browser, can be activated (Step S2). Then, the accessing Member can input a URL, obtained in advance, to access the System 1 (Step S3).

The present invention envisions two kinds of URLs. A first kind of URL is common to the whole system. The second kind of URLs are classified according to each Franchise Store. For example, a second kind of URL could take the general form http://www.abc.xyz.co.jp, which can be for one of the Franchise Stores. The part "abc" of the URL identifies the Franchise Store. The URL without the part "abc" can be the first type URL used commonly in the whole System 1. In any case, the accessing Member shall be connected with H.Server 10 by the "xyz.co.jp" portion of the URL (Step S4). At that time, H.Server 10 can judge whether the access is the first or the second one and so on, by confirming the Terminal ID Code provided to the H.Server 10 in a Member's first access from M.Server 30 (Step S5). If it is the first access by the Member, a Member ID No. and a Password are requested to be added. The H.Server 10 can recognize whether the access is from the Member or not, by comparing such input data with the Member's Data cataloged in Member's Data Base 13 (Step S6, S7).

In the above Steps S6 and S7, the above Member ID No. and Password had been obtained from the Member when the Member applied for entry at the Franchise Store, and such data can be cataloged in Member Data Base 13 of H.Server 10, based on the notice from the Franchise Store. When such a Member ID No. or Password is different from what has been cataloged, or when there is no input from an accessing Member, H.Server 10 judges that the access is from a non-Member and displays a home page for guests (Step S8). However, when the H.Server judges that the input Member ID No. and Password are what has already been entered, and that the access from M. Server 30 is the second one (or third, fourth one), the H.Server 10 determines whether or not the URL entered by the accessing Member is specific to one of the Franchise Stores. (Step S9). For example, referring to the specific URL example above, if there is not an "abc" part in the input URL and/or it is not possible to specify a Franchise Store by the URL, then, the H.Server 10 requests the accessing Member 30 to again input data for identifying the Membership, based on Member Data Base 13, in order to recognize to which Franchise Store, the accessing Member belongs (Step S10).

Once a Membership and Franchise Store have been confirmed, H.Server 10 next reads the home page data for store name logo and figures, as shown in FIG. 4 for example, from Home Page Data Base 15. Then, the H.Server 10 can create a home page for the Franchise Store concerned, using the merchandise data read out from Goods Master Database 11 and various contents 12, and can send the resulting home page to the accessing M.Server 30 (Step S11). Moreover, the H.Server 10 can also obtain the purchase order data including the Member's ID No., ordered goods, delivery method, and payment method, when M.Server 30 has processed a purchase order (Step S12). In this way, when the order from a Member belonging to a Franchise Store has been received and processed, H.Server 10 can transfer the received order data to the appropriate F.Server 20 via network 40 (e.g., the Internet), including by e-mail.

The Franchise Store which has received order data from H.Server 10, can deliver the goods and receive payment according to the transferred order data, after having contacted the Member ordering directly. If the Franchise Store has no stock of ordered goods, the Franchise Store can get such good concerned from the Headquarter or by way of the Headquarter. In this way, electronic commerce using such Home Pages on the Internet can be undertaken.

In the System 1 described, each Franchise Store does not need to create/maintain/control its own Home Page, but at the same time is able to show the customized Home Page to its members. Moreover, each Franchise Store can supply many kinds of goods information, not only for its own stocked items, but also for other goods based on the huge scale of data at a Headquarters.

In the particular embodiment described above, each Franchise Store could be identified by the URL sent from an M.Server 30. It is also possible for each Franchise Store to identify the Franchise Store according to a section of the Member's ID No. and/or password so that H.Server 10 may specify the Franchise Store based on the Member's ID No. and/or password. Besides transferring the received order data to a Franchise Store via the Internet, such data may also be sent by documents or in other transfer ways. In basic form, a System according to the present invention can create a customized Home Page for each Franchise Store, although the System 1 may operate while omitting home page creation.

With the present invention, as described by a particular embodiment above, an H.Server 10 can identify a Franchise Store to which Members belong by URLs or ID Nos. input by Members, for example, when the Members collected by each Franchise Store order some goods through a home page created by a Headquarter. Then, such received order data can be transmitted to the identified Franchise Store. Therefore, the Franchise Store is able to execute electronic commerce over the Internet by delivering the goods to the Member concerned and receiving money from the Member according to the order data, even if the Franchise Store does not have its own home page. In such an arrangement, such a Franchise Store is able to present a huge volume of goods data including goods in stock owned by the Headquarters.

Also, when any procedures related to copyrights of records/CDs are required, the Headquarters can perform such procedures for the Franchise Store, and each Franchise Store can enjoy executing electronic commerce efficiently at low costs. When a Member belonging to a Franchise Store has accessed an H.Server via Internet, a customized home page can be displayed to the Member and the Member feels as if they were trading directly with the Franchise Store, without awareness of the Headquarter.

Consequently, according to the present invention, a Franchise Store is able to promote its existence more efficiently and to promote its sales activity.

What is claimed is:

1. A franchise system for organizing and establishing a headquarter for business transactions over a network, comprising:

at least one headquarter network server; and a plurality of franchise store servers, each corresponding to a different franchise store and connected with the at least one headquarter network server by a network; wherein the at least one headquarter network server includes, a merchandise information memory data that includes information for goods sold by the franchise stores, as well as goods not available at one of the franchise stores, but available at the headquarter, a home page creation system that accesses the merchandise information memory data for merchandise information to create a home page of each franchise store, and that accesses a home page data memory system to collect additional home page data for the home page of each franchise store, the home page creation system also accessing a franchise store identification (ID) system, an order receiving system that processes orders from a plurality of member terminals through the home pages of each franchise store, a received data transfer system that transfers order data received by the order receiving system from the at least one headquarter network server to one of the franchise servers according to the franchise store ID system, the order data including a member name and goods ordered, and the franchise store ID system matches a franchise store to a member ordering via a member terminal when the member accesses the franchise system, the franchise store ID system matching franchise stores to the member accessing the franchise system based on uniform resource locator values set up in advance according to predetermined rules, the uniform resource locator values include a first portion unique to each franchise store and a second portion common to all franchise stores and the headquarters; and the at least one headquarter network server is configured to send home page data for the home page of each franchise store to at least one predetermined member server, including information from the merchandise information memory data that enables the home page of each franchise store to include goods not available at the franchise store but available at the headquarter, and sends predetermined guest home page data when a member server accessing the franchise system does not match any franchise store.

2. The franchise system of claim 1, wherein:
the network includes the Internet.

3. The franchise system of claim 1, wherein:
the at least one headquarter network server further includes a member entry data base that identifies previously accessing members and matches said members to a predetermined franchise store according to said member entry data.

4. The franchise system of claim 3, wherein:
the member entry data base includes member entries comprising a member identification (ID) value, a password, a franchise store code, and a terminal identification (ID) code.

5. The franchise system of claim 4, wherein:
at least a portion of the member ID value includes at least a portion of the store code.

6. The franchise system of claim 4, wherein:
at least a portion of the password includes at least a portion of the store code.

7. An electronic franchise shopping system for a plurality of franchise stores, comprising:

a plurality of franchise store servers, each corresponding to a different franchise store and connected with at least one headquarter network server by a network; and the at least one headquarter network server, comprising a goods master data base that stores goods information for goods sold by the plurality of franchise stores, such goods including goods available at a particular franchise store and not available at the particular franchise store but available at a headquarter, a member entry data base that stores, for each member that has previously accessed the system, a member identification value and corresponding franchise store code, a franchise store data base that stores, for each franchise store, a franchise store identification value and corresponding franchise store code, a home page data base that stores, for each franchise store, unique web page data for a web page corresponding to each franchise store, a franchise store identification (ID) system that matches each franchise store to a member ordering when the member accesses the system from a remote user terminal, the franchise store ID system determining if data sent by the member includes a predetermined terminal identification code unique to the remote user terminal, and matching the member to a matching franchise store ID if such a terminal identification code is present, else requesting the member to enter at least a member identification value, and an order system that receives orders through each home page for the franchise stores and transfers said order data from the at least one headquarter network server to the franchise server corresponding to the home page, the order data including at least a member identification and goods identification; and the at least one headquarter network server is configured to provide a home page for an accessing member according to unique web page data for each franchise store and goods information from the goods master data base that enables the home page to include information for goods not available at the particular franchise store but available at the headquarter, the home page being generated according to a predetermined data sent by the member from a remote user terminal, and send predetermined quest home page data when a member server accessing the franchise system does not match any franchise store.

8. The electronic franchise shopping system of claim 7, wherein:
the franchise store ID system also requests the user to enter a password when the terminal identification code is not present, and
the at least one headquarter network server is also configured to send home page data corresponding to one of the franchise stores if the member identification value and password correspond to the one franchise store.

9. The electronic franchise shopping system of claim 7, wherein:
the at least one headquarter network server is also configured to generate a home page based on universal resource locator (url) data sent by the user.

10. The electronic franchise shopping system of claim 9, wherein:
the url data sent includes a first portion corresponding to the franchise, and a second portion unique to each franchise store.

11. The electronic franchise shopping system of claim 7, wherein:
the at least one headquarter network server further includes a clearance system that executes copyright clearance procedures on behalf of a franchise store for good ordered through the web page of the franchise store.

12. An electronic franchise shopping system for a plurality of franchise stores, comprising:
at least one headquarter server, comprising:
a goods master data base that stores merchandise data for merchandise sold by all franchise stores,
a member entry data base that commonly stores data for members belonging to each franchise store, said member data including at least a member identification value, member password, and franchise store code corresponding to the franchise store to which the member belongs,
a franchise store data base that stores the franchise store code for each franchise store,
a home page data base that stores home page data for each franchise store,
a franchise store identification (ID) system that checks if an accessing member is accessing the system for the first time, and requests a member identification number and member password if the access is a first time access, the franchise store ID system also comparing an entered member identification value and member password to entries in the member entry data base, and if the member identification value and password match an entry in the member entry data base matching the accessing member to the corresponding franchise store, else matching the accessing member to a guest home page,
an order processing system that receives orders from members through home pages each corresponding to a particular franchise store, said orders including order data identifying a member and goods ordered;
the at least one headquarter server is configured to send home page data according to a first type universal resource locator (URL) and a plurality of second type URLs, the first type URL comprising a URL common to the system, each second type URL corresponding to a different franchise store, the at least one headquarter server also configured to send a home page for a franchise store based on member entry data base information, and send a unique home page for each second type URL, each such unique home page including merchandise data for merchandise available at the franchise store, and merchandise not available at the franchise store but available at a headquarter location, and send predetermined guest home page data when a member server accessing the franchise system does not match any franchise store; and
a plurality of franchise servers each corresponding to a different franchise store, each franchise server receiving order data from the at least one headquarter server received by way of the home page corresponding to the franchise store.

13. The electronic franchise shopping system of claim 12, wherein:
said member data further includes a terminal (ID) value associated with a remote user terminal.

14. The electronic franchise shopping system of claim 13, wherein:
the franchise store identification ID system checks for a terminal ID value for an accessing member, and determines that access is not a first access if the terminal ID value matches that of the member data.

15. The electronic franchise shopping system of claim 12, wherein:
the second type urls include fields of the first type url and at least one additional url field having a value unique to each franchise store.

\* \* \* \* \*